Dec. 20, 1949     C. A. OLCOTT     2,491,759
BRAKE CONTROL SYSTEM
Filed Nov. 14, 1944
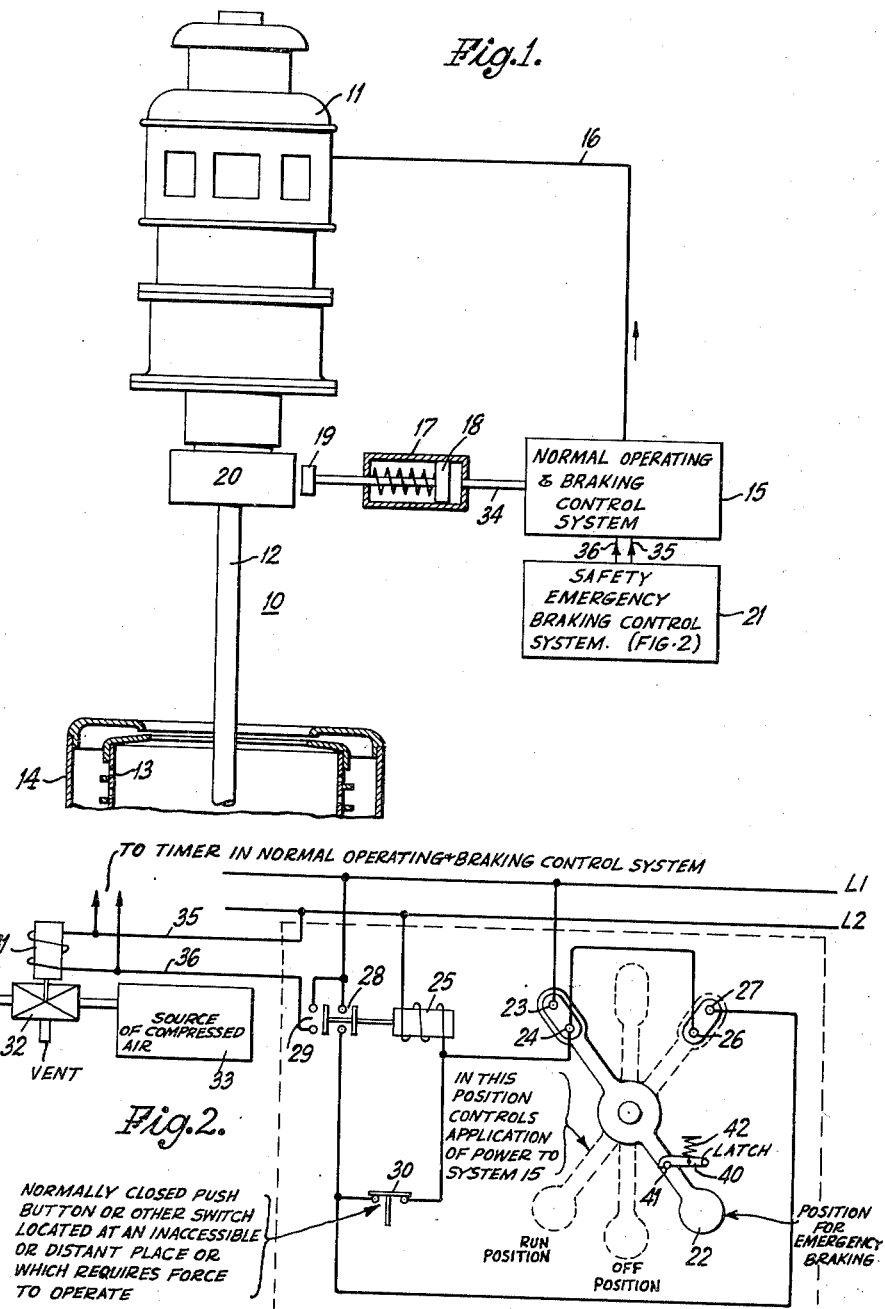
INVENTOR.
CHARLES A. OLCOTT
BY Hugh S. Wertz
ATTORNEY Patented Dec. 20, 1949

2,491,759

UNITED STATES PATENT OFFICE 2,491,759

BRAKE CONTROL SYSTEM

Charles A. Olcott, West Milford, N. J.

Application November 14, 1944, Serial No. 563,392

6 Claims. (Cl. 188—158)

This invention relates to brakes and more specifically to emergency braking means for rotating machinery such as, for example, sugar centrifugals.

It is an object of this invention to provide a novel safety emergency brake arrangement for rotating machinery and more especially for that class of rotating machinery, of which a sugar centrifugal is an example, which is adapted to go through a complete cycle of acceleration, normal running, and braking many times during an hour.

In electrically driven centrifugals, it is common practice to use two-speed motors. The high speed connection is used for driving the machines at top speed to dry the sugar while the low speed connection has several uses among which is in regenerative braking. It is common practice to bring the centrifugal machine to rest from high speed by first connecting the motor to run at low speed, with which connection the speed of the rotating machine is reduced by 50%. Then it is customary to disconnect the motor from its source of power and to apply the friction brake to stop the machine. With such an arrangement the friction brake has to do only about one-fourth as much work as it would have to do if it stopped the machine all the way from high speed. This greatly reduces the wear and heating of the brake, and keeps this brake and its brake drum down below dangerously high temperatures. It should be noted that unduly high temperatures of the brake not only cause rapid wear, but cause heat cracks in the drum, with the consequent possibility of breaking while rotating at high speed. Any suitable means for accomplishing the connection to low speed and the later disconnection of the motor and the application of the friction brake can be used, such as, for example, the arrangement shown in Patent 2,338,053 issued December 28, 1943 to C. A. Olcott.

While this combination of regenerative and friction braking is the most efficient for normal operation, it is desirable from the point of view of safety to provide an emergency brake, which means that the operator can at any time disconnect the motor and stop the machine by applying the friction brake while it is running at high speed. One such stop will not cause enough heating to do any damage so this provision of an emergency brake is entirely in the interest of safety.

Usually centrifugal operators are selected for their physical qualifications, that is, their ability to stand on their feet and work these machines hour after hour. Unfortunately many of such operators, while possessing admirable physical qualities, do not measure up to such a high standard mentally. Such an operator cannot be trusted to refrain from doing certain things which may assist him in operating the machine but which may be detrimental to the machine and perhaps cause dangerous wear and heating of the brake. This condition may occur when, due to wear or other causes, the regenerative brake and friction brake, in sequence, fail to function as they should. In such case, the operator knows enough to apply the emergency brake. However, if this condition occurs at night or at some other time when there is very little supervision, the operator may work the machine in its regular cycle, using the emergency brake manually applied, instead of the regenerative brake-friction brake combination. This has actually happened in practice, causing damage to the brake drum requiring extensive disassembly of the machine and replacement of the drum. This invention accordingly relates to an emergency braking arrangement which provides protection against such improper operation.

It is another object of this invention to provide an emergency braking arrangement for a rotating machine wherein, after the emergency brake has been once applied, it cannot be so easily released that it is practicable to use it in the regular cyclical operation of the machine.

These objects are attained in accordance with the invention by providing, by way of example for purposes of illustration, an electric circuit which is completed on the movement of an operating handle to the "Emergency braking" position. The completion of this circuit energizes a first relay which in turn causes a second circuit including a second relay to be completed, thereby controlling a valve which allows compressed air to be applied to the brake-operating mechanism to apply the brake shoe to the brake drum. Energization of the first relay completes a holding circuit, including a normally closed switch, which causes this relay to remain energized even though the operating handle is removed from the "Emergency braking" position to either of its other two positions, namely, the "Run" position (used for normal starting of the centrifugal machine) and the "Off" position (in which position the machine is not caused to run nor are the brakes applied). As long as the first relay is energized the brake is applied. In order to release the first relay and hence the brake, the normally closed switch must be opened. In order to discourage repeated uses of the emergency brake, the opening of this switch is made hard to accomplish. This can be done by locating the switch, which can be a simple push-button, in some relatively inaccessible place (such as in a foreman's office or in a locked box or at a distant point) or by requiring some force to open the switch if it is desired to locate the switch convenient to the centrifugal machine. The essential point is that the switch must be so arranged or located that it cannot be regularly used in the cyclical operation of the machine.

If the operating handle should be left in the "Run" position while the operator goes off to reset the braking mechanism by momentarily opening the normally closed switch (which would open the holding circuit and permit the first relay to become deenergized), the machine would start to run unless special means are provided for preventing this.

It is accordingly another object of this invention to provide means for preventing the release of the emergency brake while the operating handle is in the "Run" position.

This latter object is accomplished, in an illustrative embodiment of the invention, by providing a holding circuit for the first relay which maintains this relay energized (and hence the emergency brake applied) whenever the operating handle is in the "Run" position. This holding circuit is not completed when the operating handle is in the "Off" position so to release the brakes the handle is placed in the latter position and the normally closed switch is momentarily opened to deenergize the first relay.

While electrical control means have been described, satisfactory results can also be accomplished by mechanical means which will be described below.

The invention will be more readily understood by referring to the following description taken in connection with the accompanying drawing forming a part thereof in which:

Fig. 1 is a schematic view of a centrifugal machine, a motor for driving it, normal operating and braking control means, and emergency braking control means; and Fig. 2 is a circuit diagram of a safety emergency braking control system in accordance with the invention.

Referring more specifically to the drawing, Fig. 1 shows, by way of example for purposes of illustration, a centrifugal machine 10 for sugar centrifuging together with driving, control and braking means therefor. The centrifugal is preferably driven from an individual motor 11 which has high and low speed windings, is mounted above the centrifugal and is connected to drive the spindle 12 at the lower end of which is attached a rotating mesh basket 13 having an outer casing 14. For simplicity in the drawings only the top portions of the members 13 and 14 are shown.

Means for controlling the normal operation and braking of the centrifugal 10 is represented schematically by the box 15. Such a means, by way of example, is shown and described in Patent 2,338,053 issued December 28, 1943, to C. A. Olcott. In one arrangement shown in the patent, a source of power is connected to power lines which provide energy for high and low speed windings of a centrifugal driving motor, for motors of two timing mechanisms and for two relays for controlling the application of the energy to the windings and motors and the flow of compressed air at the proper time in the centrifuging cycle for the application of the brakes. When a control switch in the patented arrangement is closed, power is applied to the high speed winding of the motor (to drive the centrifugal) and to the first timer motor. After a predetermined time interval, the timer acts to control, through one of the relays, the application of power to the low speed winding and also to start the second timer. When the centrifugal is switched from the high speed winding to the low speed winding, the energy stored in the rapidly rotating mass as it is being decelerated operates to drive the centrifugal driving motor as a generator, returning current to the lines and thus acting as a regenerative brake. When the reverse torque has been applied a predetermined length of time sufficient to reduce the speed of the centrifugal to a safe value, the second timer operates to (1) energize the second relay which actuates a 3-port valve which causes the vent-port therein to be closed and allows compressed air to be applied (1) through the valve between the other two ports (one being connected to the air pressure source and the other to the brake operating member) to the friction brake to stop the centrifugal and (2) to a pressure valve to open a pair of contacts in the circuits to both the high and low speed windings of the centrifugal driving motor. Later, when the valve-operating solenoid is deenergized, the port leading to the pressure source is closed and the vent-port is opened, thus allowing the air to escape and the brake to disengage.

As explained above, sometimes due to wear or other causes the regenerative brake and friction brake, in sequence, fail to function as they should. In such an event, the operator applies the emergency brake system to be now described.

The safety emergency braking control system has been represented as a box 21 in Fig. 1 and shown in circuit and schematic diagram form within the dashed-line rectangle in Fig. 2. Referring now to Fig. 2, an operating handle 22 is shown which can, for example, comprise or control the switch for applying power to the normal operating and braking control system 15 briefly described above and in greater detail in the above-identified Olcott patent. The operating handle 22, in accordance with this invention, is adapted to be moved to at least three positions. These positions are (1) that for "Emergency braking" (shown in full lines in Fig. 2), (2) the "Off" position (shown in dashed lines), and (3) the "Run" position (also shown in dashed lines). In the "Run" position power is applied to the normal operating and braking control system 15, in the "Emergency braking" position power is cut off from this system but is utilized to control the emergency brake, while in the "Off" position power is applied to neither the system 15 nor to the emergency braking system.

Power lines L1 and L2, which can be the same lines used in the normal operating system 15 or different lines, are utilized to provide power for the emergency braking control system. Line L1 is connected to the upper one 23 of a first pair of contacts the lower one 24 of which is connected through the coil of a relay 25 to the line L2. The contacts 23 and 24 are connected together when the operating handle 22 is in the "Emergency braking" position. Connected also to the contact 24 is the lower contact 26 of a second pair of contacts the upper one 27 of which is connected through a pair of normally open contacts 28 to the line L1. The contacts 28 are also connected through a normally closed push button or other switch 30 to the coil of the relay 25, thus forming with the lines L1 and L2 a holding circuit for retaining the relay 25 energized even though the handle 22 is moved. The energization of the coil of the relay 25 also causes the normally open contacts 29 to be bridged and complete a circuit from the lines L1 and L2 which energizes through wires 35 and 36 the coil of a relay 31 which, in turn, actuates a 3-port valve 32 connected between a source of compressed air 33 and a pipe 34 leading to the cylinder 17. The members 31, 32, 33 and 34 are preferably part of the system 15 described above and in greater detail in the Olcott patent and hence have been shown in Fig. 2 outside the dashed-line rectangle.

The operation of the valve 32 and the piston 17 also operates the pressure-operated switch in the system 15 which holds open the lines from the power source to the high and low speed windings of the centrifugal driving motor 11. This last feature is an added safeguard because, even though the control handle 22 acts to cut off power to the rest of the normal control system 15 when moved from the "Run" position to the "Emergency braking" position, it prevents the operation of the motor if the handle 22 is later shifted to the "Run" position while the brake is still on.

The operation of the safety emergency braking control system will now be described. Assuming that the centrifugal 10 is running (either at its normal high speed or on the low speed winding of the motor 11) and for any of the reasons given above it is desired to bring the machine to a quick emergency stop, the operating handle 22 is moved from the "Run" position to the "Emergency braking" position, thus cutting off power to the motor 11 through the normal control system 15. The circuit from line L1 through contacts 23 and 24 and the coil of relay 25 to line L2 is completed, operating the relay 25 and causing it to close its contacts 28 and 29 and complete the circuit from line L1 through contacts 29, wires 35 and 36, and the coil of relay 31 to line L2. The energization of the relay 31 causes the 3-port valve 32 to be operated to the position where the air vent-port is closed and compressed air from the source 33 is applied through the pipe 34 to the cylinder 17. The friction brake shoe 19 is applied to the brake drum 20 and the machine is then quickly brought to rest. As the friction brake may have to bring the machine to rest from a high speed without the preliminary regenerative braking provided by the normal operation of the control system 15, the brake drum is heated up but this heating is not detrimental unless the emergency brake is used repeatedly at relatively small time spacings between applications. For this reason, circuit means in accordance with the invention has been provided to make the emergency brake difficult or hard to release so that it is impracticable to use the emergency brake in the normal cyclical operation of the machine. This circuit means is the holding circuit containing the normally closed push button or other switch 30. The operation of the relay 25 completes the holding circuit from line L1 through contacts 28, switch 30 and the coil of the relay 25, thus retaining the relay 25 energized (and the brake applied) even though the operating handle 22 is removed from its position for emergency braking (thus opening the contacts 23 and 24) to one of its other two positions. Hence, once the emergency brake is applied, manipulation of the operating handle 22 does not effect the release of the brake. Moreover, if the handle 22 is placed in the "Run" position, the motor does not start as the air pressure-operated switch in the system 15 is operated and holds the circuits to the winding of the motor open as long as air is applied to the brake operating member. To release the brake, the handle 22 must be in the "Off" position and the normally closed switch 30 must be opened momentarily to open the holding circuit which energizes the relay 25 through the contacts 28. Unless the handle 22 is in the "Off" position, the opening of the switch 30 will not cause the relay 25 to be deenergized because if the handle is in the "Emergency braking" position the circuit through the contacts 23 and 24 is completed while if the handle is in the "Run" position the holding circuit from line L1 through contacts 28, the second pair of contacts 27 and 26, contact 24 and the coil of relay 25 to line L2 will be completed and hold the relay 25 energized even though the switch 30 is opened. However, when the handle 22 is in the "Off" position, the operation of the switch 30 opens the holding circuit including it. As this is the only means (with the handle in that position) for energizing relay 25, this relay becomes deenergized, opens contacts 29 and thereby opens the 3-port valve 31. This causes the valve 32 to close the port to the source 33 and open the vent-port, thus releasing the brake. The later closing of the switch 30 has no effect since the contacts 28 and 29 are then open. In order to make it difficult for the operator to operate the switch 30, it may be located at a distance from the machine or at some place such as in a foreman's office or in a locked box or room where it would be inconvenient or embarrassing for him to operate the switch frequently as the attention of the foreman or other persons will be drawn to the fact that something needs to be repaired or adjusted. The switch 30, instead of being inaccessible or inconveniently located, can be made physically hard to operate by providing a strong spring so that it is difficult and arduous to reset the brake. In this latter arrangement, the switch 30 can be arranged near the machine, if desired. In the specification and claims, the terms "hard" or "difficult" are intended to apply to all of these inconveniences, that is, inaccessibility, embarrassment, distance from the machine, physical difficulty, and the like.

As an alternative, a latch 40 can be provided on the operating handle which is forced over pin 41 on the handle by the compression of a spring 42 and holds the handle 22 in the "Emergency braking" position once it is moved in that position. Thus the operator cannot release the emergency brake except by calling in a mechanic or by pressing a reset button for releasing the latch 40 and permitting a spring (not shown) to move the operating handle to the "Off" position. This arrangement also is "difficult" for the operator to operate.

It is obvious that the invention provides an emergency brake system which can be easily applied but which is so difficult to disconnect that the emergency brake system is not likely to be used in the cyclical operation of the machine. Moreover, means are provided so that the brake cannot be released unless the operating handle is in the "Off" position.

Various other modifications can be made in the above-described embodiments without departing from the spirit of the invention, the scope of which is indicated by the claims. For example, although in the preferred embodiment the same brake and air-pressure system for operating it are used in both the normal and emergency systems, obviously different brakes and operative systems therefor can be used for these two systems, if desired.

What is claimed is:

1. In combination, a rotating member, a brake for said member, a control member adapted in a first position thereof to cause power to be applied to said rotating member and in a second position thereof to control the application of said brake to said member and which control member also has a neutral position, circuit means operated when said control member is in said second position for controlling the application of said brake, circuit means for controlling the release of the brake, and circuit means preventing the release of said brake except when said control member is in the neutral position.

2. In combination, a rotating member, a brake for said member, a control member adapted in a first position thereof to cause power to be applied to said rotating member and in a second position thereof to control the application of said brake to said member and which control member also has a neutral position, circuit means operated when said control member is in said second position for controlling the application of said brake, circuit means for controlling the release of the brake, and circuit means preventing the release of said brake except when said control member in the neutral position, said last-mentioned means including a circuit controlling the application of said brake which is closed in both said first and second positions of said control member.

3. In combination, a rotating member, a brake for said member, a control member adapted in a first position thereof to cause power to be applied to said rotating member and in a second position thereof to control the application of said brake to said member and which control member also has a neutral position, circuit means operated when said control member is in said second position for controlling the application of said brake, circuit means for controlling the release of the brake, and circuit means preventing the release of said brake except when said control member is in the neutral position, said means for controlling the release of the brake including a switch element located at a point distant from said rotating member.

4. In combination, a rotating member, a brake for said member, a control member adapted in a first position thereof to cause power to be applied to said rotating member and in a second position thereof to control the application of said brake to said member and which control member also has a neutral position, circuit means operated when said control member is in said second position for controlling the application of said brake, circuit means for controlling the release of the brake, and circuit means preventing the release of said brake except when said control member is in the neutral position, said means for controlling the release of the brake including a switch element located at a place relatively inaccessible to the operator of the rotating member.

5. In combination, a source of power, a first relay, a second relay, a control member having associated therewith a first pair of contacts which are closed when the control member is in a certain position, circuit means for causing the operation of the first relay by said source when the control member is placed in said certain position, a circuit including said second relay, said source, and a second pair of contacts which are closed by the operation of said first relay, a brake for a rotating member, a brake means controlled by the last-mentioned circuit for controlling the operation of said brake, and a holding circuit, including a switch hard to open and a third pair of contacts which are also closed by the operation of said first relay, for maintaining said brake applied by maintaining the first relay operated even though the control member is moved away from its first position and thereby opens the circuit including the first pair of contacts.

6. The combination of elements as in claim 5 in further combination with another pair of contacts associated with said control member and closed when said member is in a second certain position, and circuit means including the source of power, said other pair of contacts and said first relay for maintaining said first relay operated even if said holding circuit including the switch hard to open is opened, whereby said brake is not released as long as the control member is in either of its first and second certain positions even though said last-mentioned switch is opened.

CHARLES A. OLCOTT.

REFERENCES CITED

The following references are of record in the file of this patent:

UNITED STATES PATENTS

| Number | Name | Date |
|---|---|---|
| 1,034,472 | Magnuson | Aug. 6, 1912 |
| 1,102,246 | Coyle | July 7, 1914 |
| 1,132,408 | Upton | Mar. 16, 1915 |
| 1,336,986 | Simms | Apr. 13, 1920 |
| 1,579,455 | Remde | Apr. 6, 1926 |
| 1,655,800 | Schein | Jan. 10, 1928 |
| 1,656,174 | Dahl | Jan. 17, 1928 |

FOREIGN PATENTS

| Number | Country | Date |
|---|---|---|
| 19,214 of 1906 | Great Britain | July 11, 1907 |